E. G. K. ANDERSON.
EXTENSIBLE LAMP FOR VEHICLES.
APPLICATION FILED OCT. 4, 1917.
1,361,434.
Patented Dec. 7, 1920.
3 SHEETS—SHEET 1.
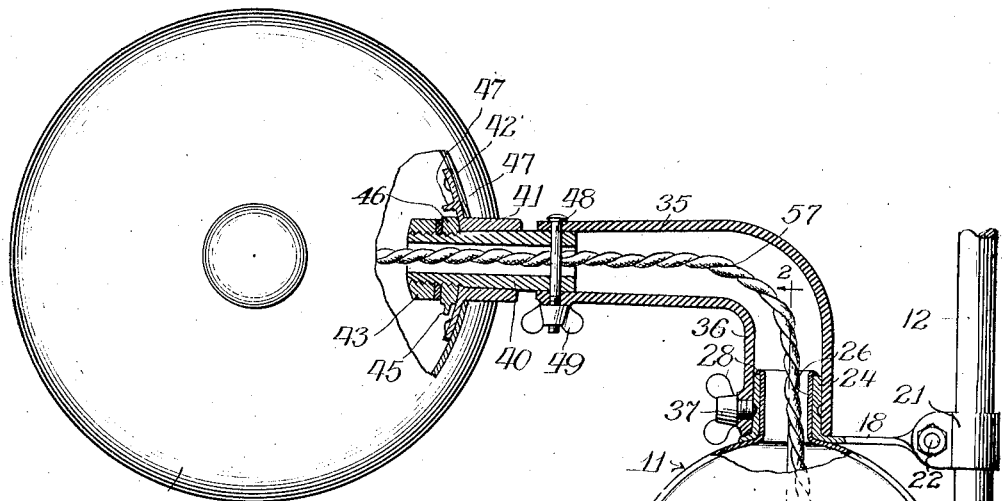
Fig. 1
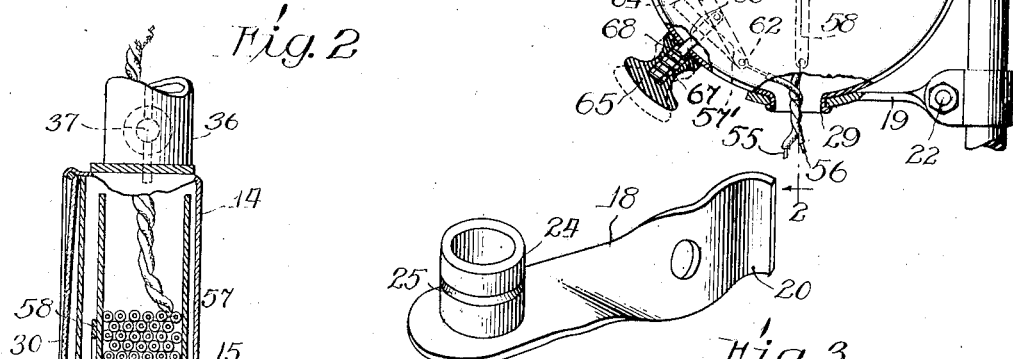
Fig. 2
Fig. 3
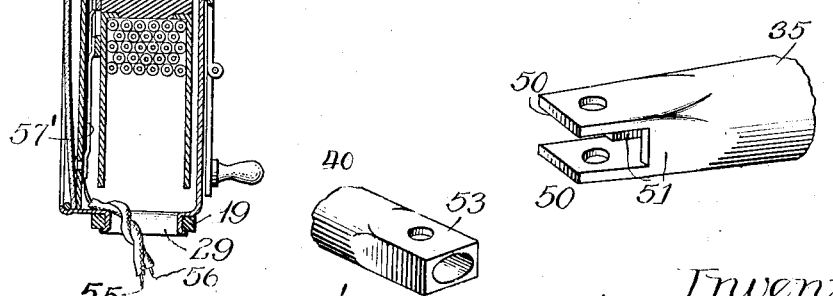
Fig. 4
Fig. 5
Witness.
Chas. R. Koursh.
Inventor.
Ernst G. K. Anderson.
By: William V. Holy
Atty.

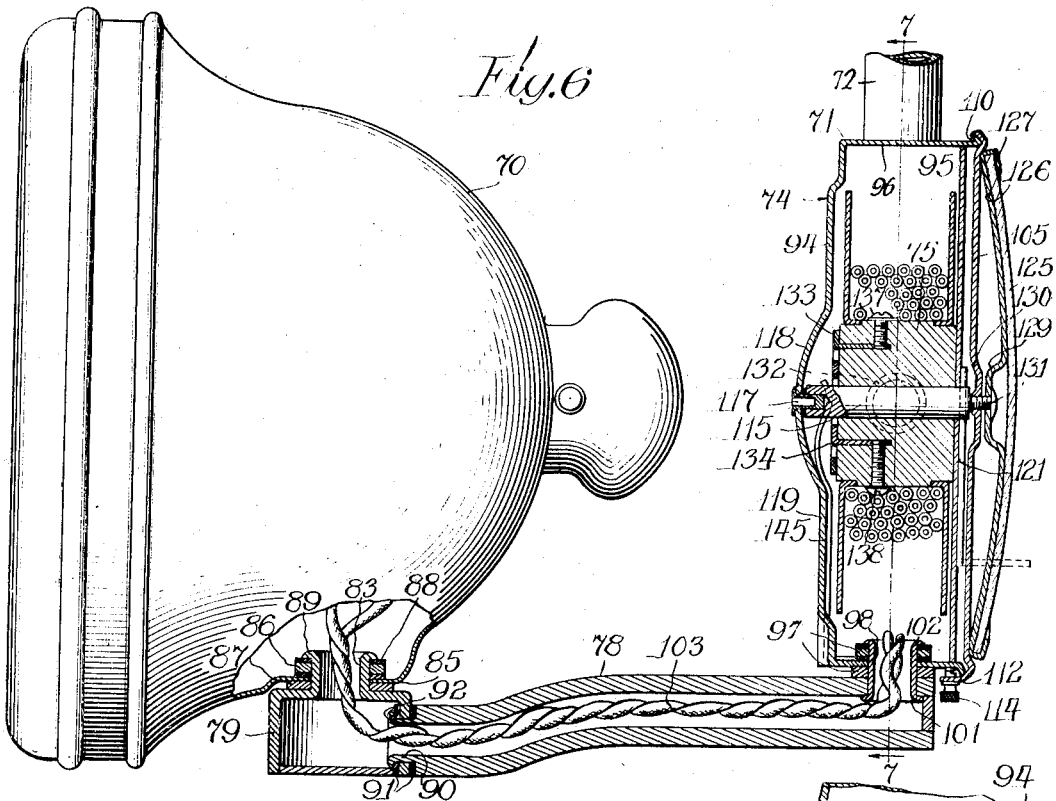

E. G. K. ANDERSON.
EXTENSIBLE LAMP FOR VEHICLES.
APPLICATION FILED OCT. 4, 1917.
1,361,434.
Patented Dec. 7, 1920.
3 SHEETS—SHEET 3.
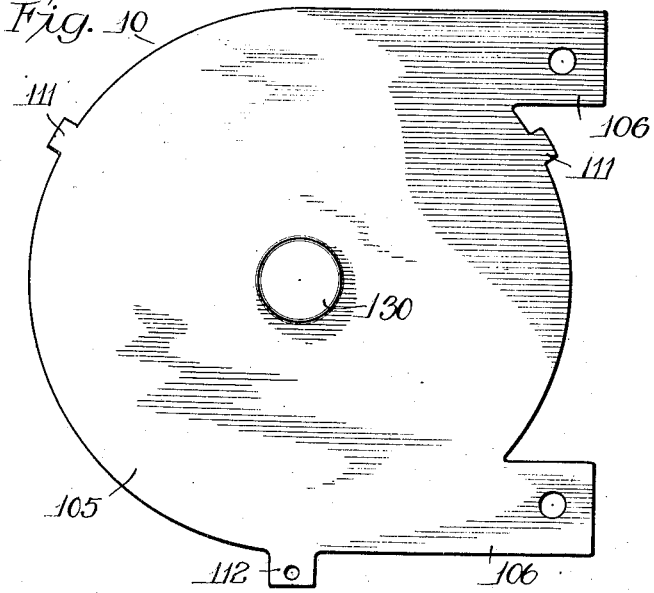
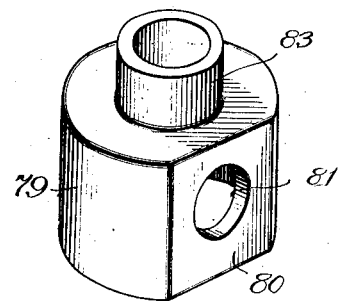
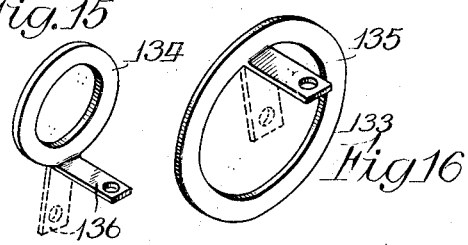
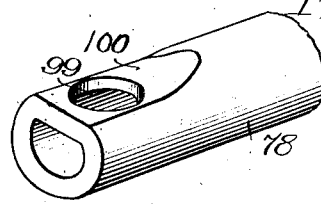
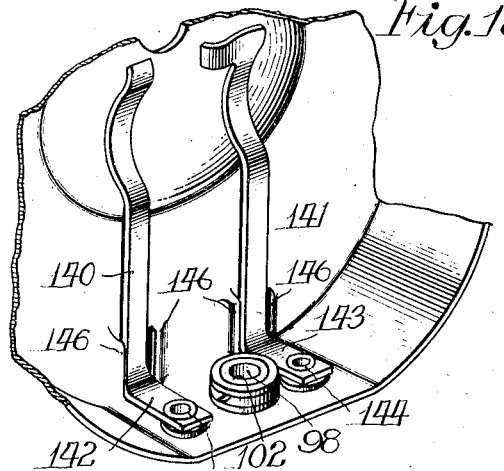
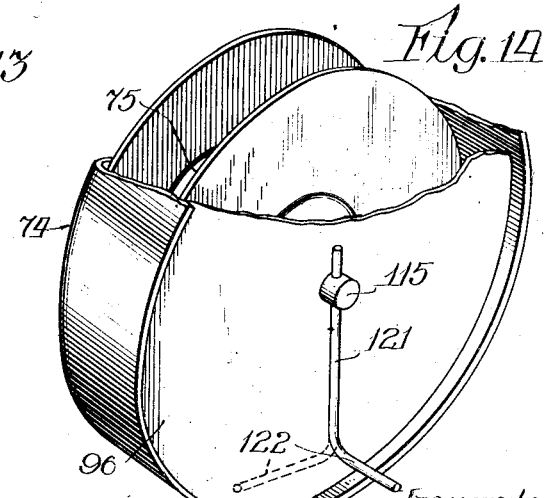

UNITED STATES PATENT OFFICE.

ERNST G. K. ANDERSON, OF CHICAGO, ILLINOIS, ASSIGNOR TO ANDERSON ELECTRIC SPECIALTY CO., OF CHICAGO, ILLINOIS, A CORPORATION OF ILLINOIS.

EXTENSIBLE LAMP FOR VEHICLES.

1,361,434.   Specification of Letters Patent.   Patented Dec. 7, 1920.

Application filed October 4, 1917. Serial No. 194,801.

*To all whom it may concern:*

Be it known that I, ERNST G. K. ANDERSON, a citizen of the United States, and a resident of Chicago, in the county of Cook and State of Illinois, have invented certain new and useful Improvements in Extensible Lamps for Vehicles; and I do hereby declare that the following is a full, clear, and exact description thereof, reference being had to the accompanying drawings, and to the characters of reference marked thereon, which form a part of this specification.

This invention relates to improvements in extensible lamps for vehicles, and refers more especially to so-called spot lamps, of that character in which the lamp is detachably fixed to the vehicle and in which there is provided a long conductor cord for connecting the lamp to the source of electrical energy, said cord being normally contained on a take-up device, as a rotative reel, from which the cord is unwound when the lamp is detached and moved away from the vehicle, whereby the lamp may be moved to any part of the vehicle for inspection purposes, or may be otherwise used at a distance from the vehicle.

In respect of certain features of the present construction, the invention may be applied to a non-extensible dirigible or universally adjustable lamp.

The object of the invention is to increase the range of universal adjustment of the lamp beyond that due to bearings arranged at right angles to each other ordinarily employed in so-called universal adjustments; to simplify the lamp mounting; to reduce the weight and cost thereof; and to render the equipment exceedingly compact.

The invention consists in the combinations and arrangement of the parts shown in the drawings and described in the specification, and is pointed out in the appended claims.

The invention is herein shown as embodied in two specific structures, differing in certain details, but it is to be understood that the structural details may be otherwise varied without departure from the spirit of the invention.

In the drawings:—

Figure 1 is a rear elevation, partly in section, of a lamp and mounting embodying my invention.

Fig. 2 is a section on the line 2—2 of Fig. 1.

Fig. 3 is a perspective view of one member of the support bracket.

Figs. 4 and 5 are fragmentary perspective views of parts of the lamp supporting bracket arm.

Fig. 6 is a partial vertical section and partial side elevation of another form of lamp mounting.

Fig. 7 is a section on the line 7—7 of Fig. 6.

Fig. 8 is a detail perspective view, illustrating the manner of locking the separable parts of the extensible lamp structure.

Fig. 9 is a section on the line 9—9 of Fig. 7.

Fig. 10 is a rear elevation of the mounting plate or member blank for the structure shown in Fig. 6.

Fig. 11 is a perspective view of the pivot member for the lamp casing.

Fig. 12 is a perspective view of one end of the lamp supporting arm.

Fig. 13 is an enlarged perspective view of the fixed terminal fingers for connecting the collector rings of the reel with a source of electrical energy.

Fig. 14 is a perspective view and a portion of its casing.

Figs. 15 and 16 are details of the collector rings.

As shown in Figs. 1 to 5, inclusive, of the drawings, 10 designates the lamp casing and 11 designates, as a whole, a bracket by which the lamp casing is supported on the vehicle, as one of the posts 12 of a wind shield frame of a motor vehicle.

The bracket embraces in its construction a casing or receptacle 14 for a take-up device consisting, in this instance of a rotative reel 15 that is fixed to a shaft 16 which has rotative bearing in the side walls of the casing 14. Said shaft is preferably made hollow.

The particular manner of attaching the bracket to the wind shield post herein shown consists in providing upper and lower bracket members 18, 19 respectively, which are attached at their outer ends to the upper and lower sides of the casing or receptacle 14. Said bracket members are preferably made of sheet metal and for a portion of their lengths lie in horizontal planes. Said members are twisted between their ends so that their inner ends lie in vertical planes. The inner ends of said members are curved at 20 (Fig. 3) to partially embrace the post 12 and constitute clamping elements which coöperate with separately applied clamping elements 21 (Fig. 1) that are clamped upon the post through the medium of threaded bolts 22 and their nuts.

The upper bracket member 18 is formed at its outer end with an integral upright hollow lug 24 which is provided with an exterior annular recess 25. The means herein shown for connecting the upper side of the reel casing 14 to the bracket member 18 consists in forming a nipple 26 from the metal of the peripheral wall of the casing at its upper side, which nipple extends through and fits closely in the hollow lug 24 of the upper bracket member, and the upper edge of said nipple is flanged over the upper end of the stud at 28.

The lower bracket member 19 is provided with an opening through which extends a short nipple 29 formed from the peripheral wall of the casing at the lower side thereof, and said nipple is spun at its lower end over the lower surface of the bracket member around the opening therein.

The construction described is useful in mountings wherein the rear side of the casing 14 carries a fixed reducing mirror 30, as in the construction herein shown. The manner of mounting the receptacle on the bracket arms permits sidewise tipping of the casing so as to provide lateral adjustment of the reducing mirror relatively to the vehicle. It will be understood that the nipples 26 and 29 fit snugly in the respective openings of the bracket members so that when the mirror is once adjusted it will remain in its adjusted position. The vertical adjustment of the mirror may be effected by raising or lowering engagement of the clamping members of the bracket members 18, 19 on the post 12.

The lamp casing 10 is supported from the reel casing or receptacle 14 through the medium of an L-shape hollow arm 35, the lamp casing being carried by the outer end of said arm. The hollow, downturned end 36 of said arm is fitted over the hollow lug 24 and may be connected thereto so as to rotate thereon in a horizontal plane through the medium of a thumb screw 37 which is threaded through the downturned end of the bracket arm, with its inner end seated in the annular groove 25. This connection normally avoids endwise displacement of the arm 35 relatively to the bracket member 18, while at the same time permits said arm to rotate on the stud 24. By releasing the screw 37, the lamp casing and arm 35 can be moved away from the reel casing or housing 14 to any distance within the length of the conductor cord 57, so that the lamp may serve or function as a trouble lamp.

As a further and separate improvement the bracket arm 35 is provided with an additional flexing joint which permits the lamp casing to be swung in a horizontal direction relatively to the main portion of the bracket arm 35, and thereby increase the range or flexibility of adjustment of the lamp casing. The means whereby this additional movement of the lamp casing may be brought about is shown in Figs. 1, 4 and 5 as made as follows:—

40 designates a short tube section which is exteriorly tapered to fit the interior taper of a bushing 41 that extends outwardly through an opening in the lamp casing and is provided with a flange 42 which lies inside the casing wall and may be attached thereto in any suitable manner, as by the rivets shown. The inner end of the tubular member 40 is threaded to receive a clamping nut 43 which serves to force the tapers of the members 40, 41 into frictional contact so as to hold the parts from accidental rotation, while permitting the lamp casing to be turned thereon by the exercise of a moderate force applied to the casing. This construction permits adjustment of the lamp casing in vertical direction. A stop 45 on a washer 46 that is locked to the bracket member 40 engages a stop lug 47 stationary with the casing so as to limit rotative movement of the casing on said member 40.

The said tubular bracket member 40 is hinged to the bracket member 35 through the medium of hinge pin 48 that is screw threaded at one end to receive a lock nut 49. As herein shown the bracket member 35 is of rectangular cross section at its outer end, (Fig. 5), and the upper and lower walls 50 of said rectangular portion extend beyond the lateral walls 51 thereof so as to constitute hinge ears or lugs. The adjacent end 53 of the other bracket member 40 is likewise of rectangular cross section and is made of such dimensions as to fit snugly between the ears or lugs 50 of the member 35. The said rectangular portion 53 and ears 50 are pierced in their overlapping parts to receive the pivot pin 48.

The hinge connection between the bracket members 35, 40 permits the outer bracket member 40 to be swung horizontally through a substantial range relatively to the bracket member 35. If the bracket arm which connects the reel casing 14 to the lamp casing 10 be rigid throughout its length, it will be clear that said lamp casing would always occupy a given fixed position relatively to the bracket arm and that in the horizontal swing of the arm 35 the rays thrown by the lamp would likewise assume a given fixed angle to the plane of the axis of rotation of said bracket arm at its connection with the reel casing 14. The provision of the hinge joint in the bracket arm 35, however, permits the angle of the throw of the light to be varied throughout a substantial angle to the fixed throw consequent upon a continuously rigid bracket arm or member. This construction gives greater flexibility to the adjustment of the lamp and enables the lamp rays, when the lamp occupies its normal station on the vehicle, to be thrown into various parts of the vehicle not accessible with prior constructions, and also permits the lamp to be adjusted in rear of the wind shield so as to direct the light rays through the shield when driving in rainy weather.

The conductors 55, 56 which lead from the battery or other source of electrical energy, are connected to the wires of the conductor cord 57 on the reel through terminals and an operating switch made as follows:—The wire 55 is connected to a switch blade 57' and the wire 56 is connected to a terminal strip 58, as shown in dotted lines in Fig. 1. The terminal strip 58 is in contact with a conductor ring 59 which is fixed in any suitable manner to one end face of the reel and rotates therewith. 60 designates a dead terminal which is in contact with a second, larger ring 61 also mounted on one end face of and rotating with the reel. The switch blade 57' is hinged at 62 to the casing wall and is movable into and out of contact with a lug or lateral extension 64 of the dead terminal 60 to thereby open and close the lighting circuit. The means herein shown for actuating the switch blade consists of a hollow hand piece 65 into the bore of which extends a link 66 that is headed at its outer end within the bore. A spiral spring 67 interposed between said head and a shoulder 68 in the bore serves to normally force the head end of the link into the bottom of the bore of the hand piece 65. When the hand piece is pulled outwardly the spring 67, which is comparatively light, is placed under compression until the force stored up therein is sufficient to sharply draw the switch blade 57' away from the extension 64 of the dead terminal 60, whereupon the circuit is open. The circuit is more slowly closed by pushing the hand piece inwardly from the dotted line position indicated in Fig. 1 after the spring has restored the link to its normal position, with its head engaged with the bottom of the bore of the hand piece.

Referring next to the construction shown in Figs. 6 to 16 inclusive, 70 designates the lamp casing and 71 designates, as a whole, the bracket by which the casing is adjustably attached to a support 72, as the post of a wind shield frame. Said bracket comprises, generally, a casing 74 to inclose a take-up reel 75 for the conductor cord 76, a hollow bracket arm 78 that is hinged to the casing and a hollow fitting 79 that is rotatively connected to said bracket arm to rotate about a horizontal axis, and to which, in turn, the lamp casing is connected to swing about an axis disposed at a right angle to the turning axis of the fitting 79 of the bracket arm. The said fitting 79 serves the general function, in connection with the bracket arm 78, as the member 40 shown in Fig. 1, in that this connection of said bracket arm and lamp casing affords means by which the lamp casing may be swung both horizontally and laterally relatively to the bracket arm 78, corresponding to the bracket 35 of Fig. 1.

The said fitting 79 (Figs. 6 and 11), comprises a hollow, generally cylindric, body portion which is flattened at one side 80 and is provided in its flat face with an opening 81. One end of the fitting is formed to provide a nipple 83 which extends upwardly through an opening in a flattened portion 85 of the bottom wall of the lamp casing and through inner and outer friction washers 86, 87. The inner friction washer 86 is faced by metal washers and the inner end of the nipple 83 is spun over the upper metal washer 88 at 89 to produce a rotative or swivel joint.

The bracket arm 78 is reduced at 90 to constitute an extension which extends through the opening 81 in the flattened walls 80 of the fitting 79 and through facing washers 91 at the inner and outer faces of said wall; and the extreme end of the inner facing tension is spun at 92 over the inner facing washer 91 to constitute a horizontal rotative connection between said fitting and the bracket arm.

The reel casing comprises a front wall 94, a rear wall 95 and a peripheral wall 96. Said peripheral wall is flattened at the lower side of the casing and is provided in its flattened portion with an opening, upwardly through which, and through friction washers 97 above and below said flattened portion of the casing wall, extends a hollow pivot stud 98. Said stud also extends through an opening 99 in a flattened portion 100 of the adjacent end of the bracket arm 78. The stud is flanged or spun at 101 at its lower end over the inner face of the flattened wall of the bracket arm, and is also flanged or spun at 102 at its upper end over the upper friction washer 97. A lamp cord 103, of fixed length, extends through the hollow stud 98, the bracket arm 78 and the fitting 79 into the lamp casing and is fixed at its reel end to terminal fingers or brushes that conduct current from the wires of the conductor cord 76 in a manner hereinafter described.

The joint described constitutes means whereby the bracket arm may be swung horizontally about the vertical axis of the stud. When the parts are in the position shown in Fig. 6 the lamp casing may be swung horizontally about the vertical axis of the fitting 79 and, by turning the fitting on the extension 90, ninety degrees from the position shown in Fig. 6, the parts are brought to a position wherein the axis of the fitting 79 is horizontal and about which axis the lamp casing may be swung vertically. The swinging connection of the arm 78 within the reel casing, together with the compound swinging movement of the lamp casing relatively to the bracket arm 78, afforded by the pivot extension 90 and nipple 83, permits angular adjustment of the lamp casing through wide vertical and horizontal angles, and with greater flexibility than that due to two pivot joints disposed at right angles to each other.

In the present instance the detachment of the lamp from its support to permit the lamp to be extended as the conductor cord is paid off the reel is brought about by detachably connecting the reel casing to a mounting or supporting plate 105, which is located in rear of said casing that is permanently connected to the post 72. As herein shown said mounting plate is provided with laterally extending arms 106, 106 that are connected by clamping bolts 107 to clamping devices 108 which encircle the post 72 and are clamped thereon by said bolts 107.

The manner of detachably connecting the reel casing to the mounting plate consists in providing the peripheral wall 96 of said casing at its rear end edge with an annular, forwardly turned flange 110, and the mounting plate 105 is provided at angularly separated points, at the upper side of the central axis thereof, with laterally turned hooks 111, which engage over the casing flange 110, and is also provided at its lower margin with an apertured hook 112 which also engages over the said flange 110 at the lower side of the casing. A set screw 114, threaded through said apertured hook serves to lock the casing on the mounting plate. Said mounting plate is preferably made of sheet metal, the blank of which is shown in Fig. 10.

When the lamp casing and the parts removable therewith are to be detached from the mounting plate, the set screw 114 is backed off until the adjacent portion of the flange 110 will pass the same, whereupon the reel casing may be disengaged from the hooks 111 of the mounting plate by swinging said casing about said hooks as pivots.

The shaft 115 of the reel is rotatively mounted at one end in the rear side wall 95 of the reel casing and its other end is socketed to receive a bearing pin 117 which extends centrally through a bulging portion 118 of the front side wall 94 of the reel casing. The said reel may be either automatically or manually rewound. As herein shown the shaft is associated with a crank by which to rewind the conductor cord on the reel. The crank herein shown consists of a small rod or wire 121 (Figs. 6 and 14) which extends through that end of the shaft 115 that projects rearwardly beyond the rear side wall 95 of the reel casing, and said shaft is provided with a crank arm 122 by which to rotate the reel. The rod 121 is rotatively seated in the extended end of the reel shaft 115, so that, normally, the crank portion 122 may lie flatwise against the adjacent wall 95 of the casing.

A reducing mirror 125 may be mounted on the rear side of the reel casing, and is herein shown as supported in a frame plate 126, the edges of which are folded back over the edges of the mirror to constitute a retaining flange 127. Said mirror frame plate may be supported on the reel casing mounting plate in any suitable manner. As herein shown the central portion of the plate is pressed inwardly to produce a flattened area 129 which faces toward a raised flattened portion 130 of the mounting plate 105, and a screw 131 extends through the portion 129 and is threaded into the adjacent central portion of the mounting plate 105. Said screw is riveted or otherwise non-rotatively fixed to the mirror frame plate so that it may be turned into the threaded opening in the reel casing mounting plate by rotation of the mirror frame plate. This construction permits ready removal of the mirror and replacement thereof in the event the mirror is broken.

In the present construction, wherein the reel casing constitutes a unitary part of the structure which is detached when the lamp is extended, the portion of the conductor cord which is wound upon and unwound from the reel is that portion 76 which is adapted to be connected directly to a suitable source of electrical energy carried by the vehicle. Said conductor cord extends through an opening 132 in one side of the peripheral wall 96 of the reel casing, and the extreme end wires of said cord inside of the wound mass on the reel, are connected respectively to collector rings 133, 134 that are mounted on one end of the reel hub. Said collector rings, shown best in Figs. 15 and 16, are preferably stamped from sheet metal and are provided with laterally extending lugs 135, 136, respectively, which are inserted in openings in the reel and have contact with binding screws 137, 138, respectively, (Fig. 6) to which wires of the conductor cord 76 are connected.

The said collector rings are electrically connected to the conductor cord 103 through the medium of brushes or terminal fingers 140, 141, respectively, (Figs. 7 and 13)

which are located between the reel and the front wall of the casing and are attached by rivets 144 at their lower, rearwardly turned terminals 142, 143 to the flattened portion of the peripheral wall of the casing through which the stud 98 extends, said brushes being located on opposite sides of said stud. Suitable provisions are taken to insulate said terminals from the metal wall of the casing. Said brushes are insulated from the adjacent front wall of the casing by thin sheets of insulation 145. The said front wall is formed to provide spaced flanges 146, which are insulated from the edges of said brushes, and which prevent the brushes being forced edgewise out of position by rotative contact of the collector rings therewith. The central bulged portion 118 of the front wall affords means whereby the upper ends of said brushes may have some freedom of movement in adjusting the brushes to the rings while avoiding contact of the brushes with said wall.

In the normal position of the lamp structure, the reel casing is attached to the mounting plate 105 through the medium of the hooks 111, 112 and the screw 114. In this position the lamp may be adjusted on its pivot members 98, 90 and 83, in the manner before described, as a spot lamp. When the lamp is to be used as a trouble lamp, or is to be otherwise employed at a distance from the vehicle, the screw 114 is backed off to release the lower side of the reel casing from the mounting plate, whereupon the casing may be detached from the upper hooks 111 and the lamp moved away from its support. As the lamp is so moved away from its support the conductor cord 76 is paid off the reel. When the reel casing is thus detached from its mounting plate 105, free access may be had to the crank 122 for rewinding the conductor cord on the reel when the lamp is so returned to its normal position.

I claim as my invention:—

1. An adjustable lamp comprising, in combination, a lamp casing, a bracket, with means to detachably fix it to a support, said bracket including an arm which is freely swingable in a horizontal plane, and frictionally held on the bracket, and having means at its outer end to support the lamp casing, said lamp casing supporting means embracing freely movable, frictionally held means movable in a vertical plane and having means for supporting said lamp casing permitting the lamp casing to move in a horizontal plane, whereby said lamp casing may be swung both vertically and horizontally relatively to said arm.

2. An adjustable lamp comprising, in combination, a lamp casing, a bracket, with means to attach it to a support, said bracket including an arm freely movable and frictionally held on the bracket, and having means at its outer end to support the lamp casing, the lamp casing supporting end of said arm comprising a frictionally held, freely movable terminal member capable of angular movement relatively to the arm in one plane, and comprising also a lamp casing bearing on which said casing is freely movable and frictionally held and capable of movement in a plane at a right angle to the plane of movement of said terminal member.

3. An adjustable lamp comprising, in combination, a lamp casing, a support therefor, comprising a bracket arm, a freely movable, frictionally held swinging joint connecting said bracket arm to said support, and a freely movable frictionally held terminal member connected to said bracket arm capable of angular adjustment relatively thereto in one plane, said terminal member being provided with a friction bearing for said lamp casing about which the casing may be swung in another plane.

4. An adjustable lamp comprising, in combination, a lamp casing, a support therefor, embracing a bracket arm free to swing and frictionally connect to said support, and a freely movable, frictionally held fitting mounted on said bracket arm for angular adjustment in one plane and provided with a friction bearing for the lamp casing upon which said casing is adapted to freely rotate in another plane.

5. An adjustable lamp comprising, in combination, a lamp casing, a mounting bracket arm comprising a member having means to fix it to a support, an arm having means to connect it to said fixed member, permitting it to swing on a horizontal plane, a fitting rotatively mounted in the outer end of the bracket arm and provided with a bearing nipple for the lamp casing disposed at a right angle to the axis of the rotative connection of said fitting to the bracket arm.

6. An extensible lamp comprising, in combination, a lamp casing and a take-up device housing, upper and lower bracket arms fixed to said housing and having means to attach them to a support, a hollow bracket arm rotatively supported on said housing and having a bearing at its outer end to rotatively support the lamp casing, permitting said casing to rotate about an axis at a right angle to the axis of rotation of the arm relatively to said housing, and a conductor cord extending from said take-up device housing, through said hollow bracket arm and into said lamp casing.

7. An adjustable lamp comprising, in combination, a lamp casing, a take-up device for a conductor cord, a mounting bracket for the lamp casing embracing a casing to support said take-up device, upper and lower arms extending from said bracket and having means to attach them to a support, said bracket embracing also an arm having a swinging connection with the take-up device casing and a rotative joint between the outer end of said arm and the lamp casing.

8. An extensible lamp comprising, in combination, a lamp casing and a conductor cord take-up device, a bracket to support the lamp casing, embracing in its structure a casing to inclose and support said take-up device, a mounting plate for said take-up device casing from which the casing laterally extends, having means to attach it to a fixed support, and means to detachably support said casing on said mounting plate.

9. An extensible lamp comprising, in combination, a lamp casing and a conductor cord take-up device, a bracket to support the lamp casing, embracing in its structure a casing to inclose and support said take-up device, and a mounting plate for said take-up device casing, said mounting plate being provided at one side of its center with angularly spaced hooks to engage the take-off device casing and provided at the other side of its center with locking means to detachably engage said casing.

10. An extensible lamp comprising, in combination, a lamp casing and a conductor cord reel, a bracket to support the lamp casing embracing in its structure, a housing for said reel, means to detachably connect said housing to a fixed support and a crank for rewinding the conductor cord on said reel carried by said housing.

11. An extensible lamp comprising, in combination, a lamp casing and a conductor cord reel, a bracket to support the lamp casing embracing in its structure a housing for said reel, a mounting plate, with means to detachably fix it to a support and a reel rewinding crank member carried by and movable with the reel and normally between said housing and said mounting plate.

12. An extensible lamp comprising, in combination, a lamp casing and conductor cord reel, a bracket to adjustably support the lamp casing embracing a housing for said reel comprising front and rear walls and a peripheral wall, with bearings carried by said front and rear walls in which the shaft of the reel is rotatively mounted, a mounting plate to which said housing is detachably fixed, the end of said reel shaft adjacent to the mounting plate being apertured and a crank comprising a member that is rotatively seated in the aperture of said shaft.

13. A lamp comprising, in combination, a lamp casing and a take-up device for a conductor cord, a mounting bracket for the lamp casing embracing a housing to inclose and support the take-up device and embracing also an arm hinged to said housing, and lamp casing supporting means at the end of said arm constructed to permit universal movement of said lamp casing relatively to said arm.

14. An extensible lamp comprising, in combination, a lamp casing, a lamp conductor cord take-up device, a housing for said take-up device, and a mounting bracket for said casing and housing embracing a swinging member provided with an angularly adjustable terminal having a lamp casing supporting bearing on which said casing is free to turn.

In witness whereof I claim the foregoing as my invention, I hereunto append my signature in the presence of two witnesses at Chicago, Illinois, this 29th day of September, 1917.

ERNST G. K. ANDERSON.

Witnesses:
W. L. HALL,
S. E. WALBRIDGE.